United States Patent [19]
Vail et al.

[11] Patent Number: 5,637,210
[45] Date of Patent: Jun. 10, 1997

[54] SYSTEM FOR TREATING AQUEOUS SOLUTIONS CONTAINING INDUSTRIAL WASTES

[76] Inventors: William J. Vail, 15711 Winslow St. SW, Cumberland, Md. 21502; Robert K. Riley, Broad St., Midland, Md. 21542

[21] Appl. No.: 626,069

[22] Filed: Apr. 1, 1996

Related U.S. Application Data

[60] Division of Ser. No. 319,983, Oct. 7, 1994, Pat. No. 5,510,032, which is a continuation-in-part of Ser. No. 169,741, Dec. 17, 1993, Pat. No. 5,441,641, which is a continuation of Ser. No. 912,814, Jul. 13, 1992, abandoned.

[51] Int. Cl.⁶ .................................................... C02F 3/34
[52] U.S. Cl. ........................ 210/150; 210/170; 210/912
[58] Field of Search ................................ 210/610, 611, 210/612, 615, 617, 620, 631, 722, 747, 912, 150, 151, 170; 435/262, 262.5, 264

[56] References Cited

U.S. PATENT DOCUMENTS

| | | | |
|---|---|---|---|
| 3,349,031 | 10/1967 | Hatch et al. | 210/722 |
| 3,923,597 | 12/1975 | Chakrabarty et al. | 210/611 |
| 4,001,569 | 1/1977 | Jhaveri et al. | 210/610 |
| 4,124,501 | 11/1978 | Yen et al. | 210/611 |
| 4,200,523 | 4/1980 | Balmat | 210/611 |
| 4,218,318 | 8/1980 | Nimi et al. | 210/150 |
| 4,293,333 | 10/1981 | Drobot | 210/601 |
| 4,354,937 | 10/1982 | Hallberg | 210/607 |
| 4,468,461 | 8/1984 | Bopp | 210/611 |
| 4,519,912 | 5/1985 | Kauffman et al. | 210/611 |
| 4,519,913 | 5/1985 | Baldwin et al. | 210/611 |
| 4,522,723 | 6/1985 | Kauffman et al. | 210/611 |
| 4,530,763 | 7/1985 | Clyde et al. | 210/912 |
| 4,576,717 | 3/1986 | Collin et al. | 210/610 |
| 4,728,427 | 3/1988 | Revis et al. | 210/611 |
| 4,755,304 | 7/1988 | Hallberg et al. | 210/747 |
| 4,789,478 | 12/1988 | Revis et al. | 210/611 |
| 4,793,929 | 12/1988 | Kickuth et al. | 210/602 |
| 4,898,827 | 2/1990 | Brierley et al. | 210/601 |
| 5,062,956 | 11/1991 | Lupton et al. | 210/611 |
| 5,062,958 | 11/1991 | Bateson et al. | 210/611 |
| 5,080,793 | 1/1992 | Urlings | 210/603 |

OTHER PUBLICATIONS

Bureau of Mines Information Circular/1988, vol. 1 "Mine Water and Mine Waste".
Isolation and Culture of a Manganese–Oxidizing Bacterium from a Man–Made Cattail Wetland: Vail, Wilson, Riley.
Charleston Daily Mail; Business Section, Jan. 26, 1993, "Pair Touts Mine Stream Cleaning System".
Coal Chronical, Feb. 1993, Briefs Section "Stream Cleaning Experiment".

*Primary Examiner*—Christopher Upton
*Attorney, Agent, or Firm*—Ware, Fressola, Van Der Sluys & Adolphson

[57] ABSTRACT

A treatment zone 10 in the form of a basin 12 having an inlet port 14 and an outlet port 16. The inlet port 14 allows water to flow into the basin 12. The outlet port 16 allows water to flow out of the basin 12. The inlet port 14 and the outlet port 16 are located at opposite ends of the basin 12 so as to allow water from a body of water having a concentration of water soluble metal ions contained therein to flow substantially through the entirety of the basin 12. A porous matrix 22 is disposed within the treatment zone 10. The porous matrix 22 is inoculated with a population of aerobic metal oxidizing bacteria. The population of aerobic metal oxidizing bacteria is capable of metabolizing water soluble metal ions in the water from the body of water into water insoluble metal oxides. Thus, there is an overall decrease in the concentration of the metal ions in the water flowing out of the treatment zone 10 as compared to water flowing into the treatment zone 10. The water flow out of the treatment zone also has a higher pH than the water flowing into the treatment zone.

3 Claims, 7 Drawing Sheets

SYSTEM FOR TREATING AQUEOUS SOLUTIONS CONTAINING INDUSTRIAL WASTES

CROSS-REFERENCE TO RELATED APPLICATIONS

This is a divisional of application Ser. No. 08/319,983 filed on Oct. 7, 1994, now U.S. Pat. No. 5,510,032, which is a continuation-in-part application of U.S. patent application Ser. No. 08/169,741, filed Dec. 17, 1993, now U.S. Pat. No. 5,441,641, which is a file wrapper continuation application of U.S. patent application Ser. No. 07/912,814, filed Jul. 13, 1992, now abandoned.

BACKGROUND OF THE INVENTION

1. Field of the Invention

The present invention relates to a process for reducing the concentration of water soluble metals in aqueous solutions, and, in particular, to a process for removing iron and/or manganese ions from aqueous solutions such as mine discharge waters or spent leaching waters prior to discharging such waters into surface or ground water systems.

2. Description of the Prior Art

The quality of water in the United States is important for the health and the quality of life of the people who live therein. For more than a hundred years the quality of water has been reduced by industrial pollution and deep mining, and, more recently, surface mining. Deep and surface mining pollution of water systems have been especially prevalent in the coal-producing regions of the Appalachian mountains. The pollutants resulting from these types of mining operations include iron, sulfate, manganese, aluminum, and acidity, to name a few. The toxicity of these pollutants impact both health and recreation in those regions.

A current method that is used to reduce the ionic and acidic pollution from the water systems around mining operations consists of raising the pH of the water above 8.5 with caustic soda. Ions then precipitate from the solution as hydroxides and a high pH supernatant is then discharged into streams. This process requires continuous maintenance and replenishment of caustic soda.

Recently, microorganisms have been used to reduce the concentration of pollutants from both industrial wastes and mine discharges. There have been many reports that bacteria can be used to remove metals as sulfides and sulfates from industrial and mining wastes.

It has been shown that sulfate can be removed using sulfate reducing bacteria in an anaerobic system (see U.S. Pat. No. 4,124,501 by Yen et at. and U.S. Pat. No. 4,200,523 by Balmat). Using similar methodology, sulfate reducing bacteria grown under anaerobic conditions has been shown to yield hydrogen sulfide gas which precipitates out metals as metal sulfides (see U.S. Pat. No. 4,354,937 by Hallberg). Also, in U.S. Pat. No. 4,789,478, Revis et at. used a mixed culture of *Citrobacter freundii* and sulfate reducing bacteria so as to precipitate heavy metal ions into sulfide form. Furthermore, in U.S. Pat. No. 4,522,723, Kauffman et at. were able to precipitate out metals into sulfide species using sulfate reducing bacteria of the genera Desulfovibro and Desulfotomaculum.

Another approach was taken by Lupton et at. in U.S. Pat. No. 5,062,956. Using anaerobic sulfate reducing bacteria, they were able to precipitate chromium as an insoluble hydroxide since the removal of sulfate causes a rise in pH. Similarly, in U.S. Pat. No. 4,519,912, Kauffman et at. were able to remove sulfate and heavy metals from aqueous solutions using mixed cultures of anaerobic bacteria of the genus Clostridium and at least one other bacteria from the genera Desulfovibrio and Desulfotomaculum. Kauffman et at. used a treatment zone to carry out the removal of water soluble species of heavy metals including selenium and sulfate ions. Analogously, in U.S. Pat. No. 4,519,913, Baldwin et at. disclosed the use of a porous matrix for retaining a population of bacterium of the genus Clostridium thereby reducing the concentration of water soluble ionic selenium species. The bacteria were grown under anaerobic conditions and definitive temperature and pH conditions.

In addition to the anaerobic methods discussed above, there have been several reports of using aerobic microorganisms to reduce the concentrations of ions in waste water. For example, in U.S. Pat. No. 3,923,597, Chakrabarty et at. used a genetically engineered species of Pseudomonas to remove mercury as a pollutant or an impurity. Also, in U.S. Pat. No. 4,468,461, Bopp was able to remove chromate from waste water using a strain of *Pseudomonas fluorescens*. Furthermore, in U.S. Pat. No. 4,728,427, Revis et at. were able to reduce the concentration of at least one heavy metal from an aqueous waste solution using a culture of *Pseudomonas maltophilia*. Moreover, in U.S. Pat. No. 4,898,827, Briery et al. were able to remove ionic species of Ag, Cu, Pb, Cr, and Ni from waste waters using *Bacillus subtilis* and in the process recover these metals.

It has also been shown that metals can be recovered from aqueous solutions such as industrial waste water using several species of fungi (see U.S. Pat. No. 4,293,333 by Drobot).

In U.S. Pat. No. 4,530,763, Clyde et at. describe a method for treating waste fluids so as to remove selected chemicals with bacteria attached to porous fiber webbing. The waste fluids, containing nutrients, are drawn through the porous fiber webbing wherein ions of Cr, Ur, Fe, Ag, Pb, and V are removed from the solution.

Finally, it has been shown that manganese can be chemically removed from waste water by the addition of bisulfite to precipitate the manganese as manganese dioxide (see U.S. Pat. No. 3,349,031 by Hatch et at.).

Although all of the above-discussed methods are directed to treating waste water solutions and/or removing contaminants from waste water solutions, none are directed toward a process for removing iron and/or manganese ions from an aqueous solution by passing the aqueous solution through a porous matrix that is inoculated with metal oxidizing bacteria and is maintained under aerobic conditions. The present invention is directed to such a process.

SUMMARY OF THE INVENTION

The present invention contemplates a process for removing iron and/or manganese ions from an aqueous solution by passing the aqueous solution through a porous matrix that is inoculated with metal oxidizing bacteria and is maintained under aerobic conditions. As a result of this process, the pH level of the aqueous solution is significantly increased. Also, as a result of this process, the acidity level of the aqueous solution is significantly decreased. Furthermore, as a result of this process, the alkalinity level of the aqueous solution is significantly increased.

From the foregoing descriptive summary it is apparent how the present process is distinguishable from the above-mentioned prior art. Accordingly, the primary objective of the present invention is to provide a process for removing iron and/or manganese ions from an aqueous solution by passing the aqueous solution through a porous matrix that is inoculated with metal oxidizing bacteria and is maintained under aerobic conditions, and which during said removal, reduces the acidity level of the aqueous solution.

Other objectives and advantages of the present invention will become apparent to those skilled in the art upon reading the following detailed description and claims, in conjunction with the accompanying drawings which are appended hereto.

BRIEF DESCRIPTION OF THE DRAWINGS

In order to facilitate a fuller understanding of the present invention, reference is now be made to the appended drawings. The drawings should not be construed as limiting the present invention, but are intended to be exemplary only.

PREFERRED EMBODIMENT OF THE PRESENT INVENTION

A laboratory experiment was conducted so as to demonstrate how the concentration of water soluble metals may be reduced in aqueous solutions according to the present invention. In this laboratory experiment, six five-gallon buckets were filled with mine water containing 80 parts per million (ppm) manganese. Three of the five-gallon plastic buckets were filled with mine water that was taken directly from a mine seep and three of the five-gallon buckets were filled with mine water that was taken from a mine seep and then passed through a man-made cattail wetland. In four of these buckets, two containing seep water and two containing wetland water, a porous matrix of limestone shale was added. In two of these buckets, one containing seep water and limestone shale and one containing wetland water and limestone shale, an aerobic metal oxidizing bacteria, in this case the bacteria Metallogenium, was cultured on the porous matrix of limestone shale. The contents of all of the buckets were aerated by an aquarian pump and an airstone. Also, all of the buckets were held at a temperature within the range from about 32° F. to about 90° F., but it should be noted that is preferred that the buckets are held at a temperature within the range from about 50° F. to about 85° F.

The mine seep water was poor in nutrients for the bacteria while the wetland water was rich in nutrients for the bacteria. It should be noted that the nutrients in the wetland water may include biological breakdown products of plant material such as cellulose, hemicellulose, hydrocarbons, pectin and pectin substances, starches, fructans, levans, inulins, sugars, proteins, amino acids, chitin, lignin, organic acids, and derivatives of these materials. It should also be noted that the nutrients in the wetland water may include organic carbon sources such as yeast extract, malt extract, peptone, and biological and municipal waste water sludges. It should further be noted that the wetland water may also contain a trace nutrient such as the B-vitamins peridoxine and thiamine.

Figure 1:
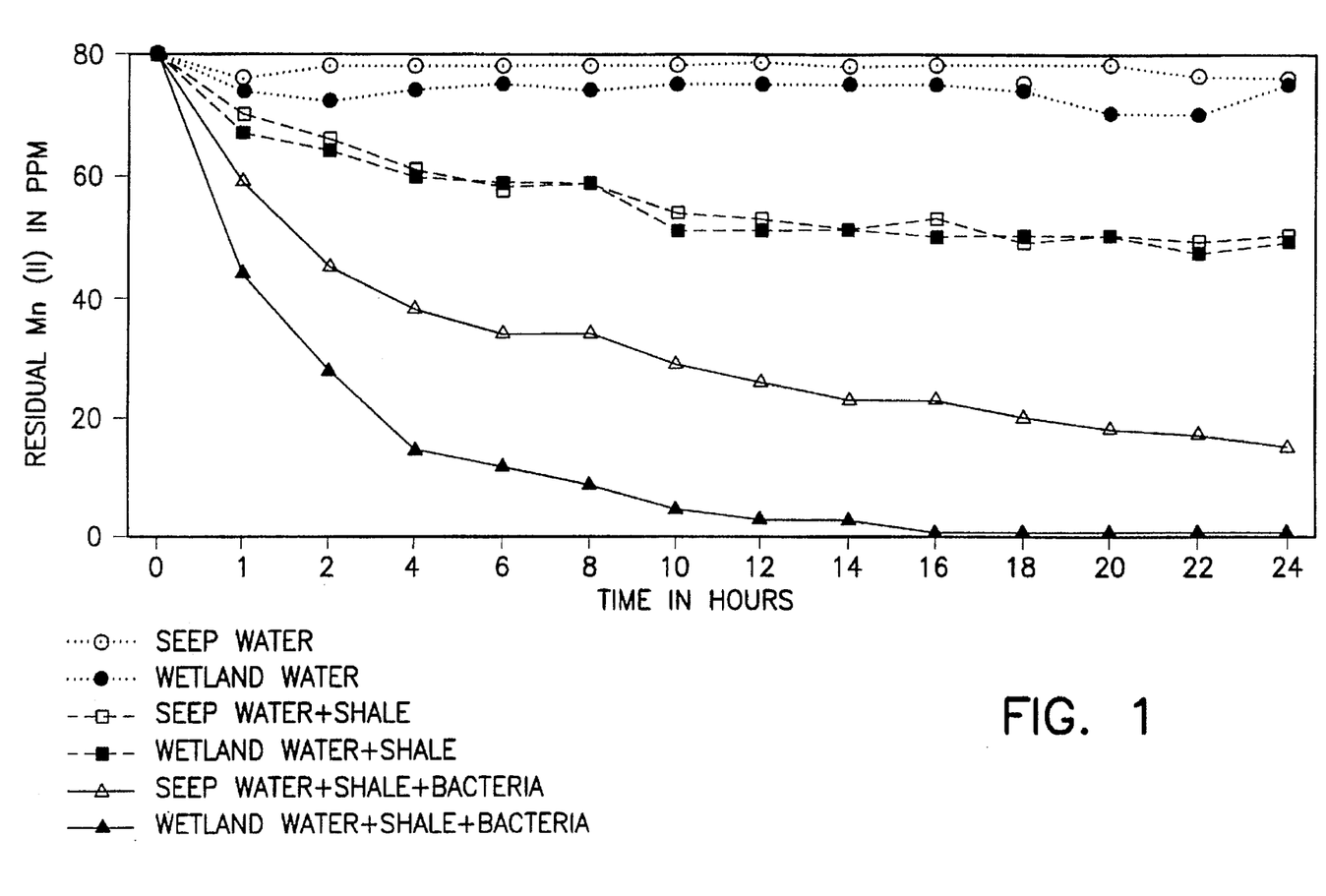
FIG. 1 is a graph showing the effect of wetland nutrients on bacterial removal of manganese from water.

Referring to FIG. 1, the results of the laboratory experiment are shown indicating the effect that wetland nutrients have on bacterial removal of manganese from water containing the same. As can be clearly seen in FIG. 1, the most effective removal of manganese occurred in the bucket containing wetland water and limestone shale inoculated with the aerobic metal oxidizing bacteria. However, there was still a reduction of manganese in the bucket containing seep water and limestone shale inoculated with the aerobic metal oxidizing bacteria.

It should be noted that the aerobic metal oxidizing bacteria metabolizes the manganese on the porous matrix so that manganese may be recovered as a water insoluble oxide of manganese.

A field experiment was also conducted so as to demonstrate how the concentration of water soluble metals may be reduced in aqueous solutions according to the present invention. In this field experiment, a treatment zone was constructed comprising a pit having the dimensions of 100 feet long, 10 feet wide, and 3 feet deep. The pit was located next to a man-made cattail wetland containing water having a manganese ion concentration ranging from about 35 ppm to about 45 ppm, an iron ion concentration ranging from about 0.02 ppm to about 0.32 ppm, a pH level ranging from about 4.5 to about 4.8, an acidity level ranging from about 85 mg/l to about 125 mg/l, an alkalinity level ranging from about 4 mg/l to about 6 mg/l, and a rich supply of nutrients for the bacteria Metallogenium. The pit was filled with a porous matrix of limestone shale, comprising about two-thirds of the total volume of the pit. The porous matrix was then inoculated with twenty five-gallon plastic buckets of aerobic metal oxidizing bacteria, in this case the bacteria Metallogenium. It should be noted that the porous matrix may be comprised of other materials such as gravel, but an alkaline based material is preferred.

The inoculum was prepared on limestone shale in the twenty five-gallon plastic buckets using water from the man-made cattail wetland site. This enrichment technique provided a steady state population of bacteria that were site specific.

After the treatment zone was inoculated with the aerobic metal oxidizing bacteria, water from the man-made cattail wetland was allowed to flow therethrough. The flow rate of the water through the treatment zone was about 2 gallons per minute thereby providing the water with a retention time in the treatment zone of about 2.5 days. Considering the dimensions of the treatment zone, the flow rate of the water through the treatment zone was about 2 gallons of water per cubic foot of the porous matrix per day. It should be noted that the flow rate of the water through the treatment zone may be controlled by gravity by properly positioning the treatment zone with respect to the man-made cattail wetland. It should also be noted that the treatment zone is left uncovered so as to allow the water to be sufficiently aerated.

Figure 2:
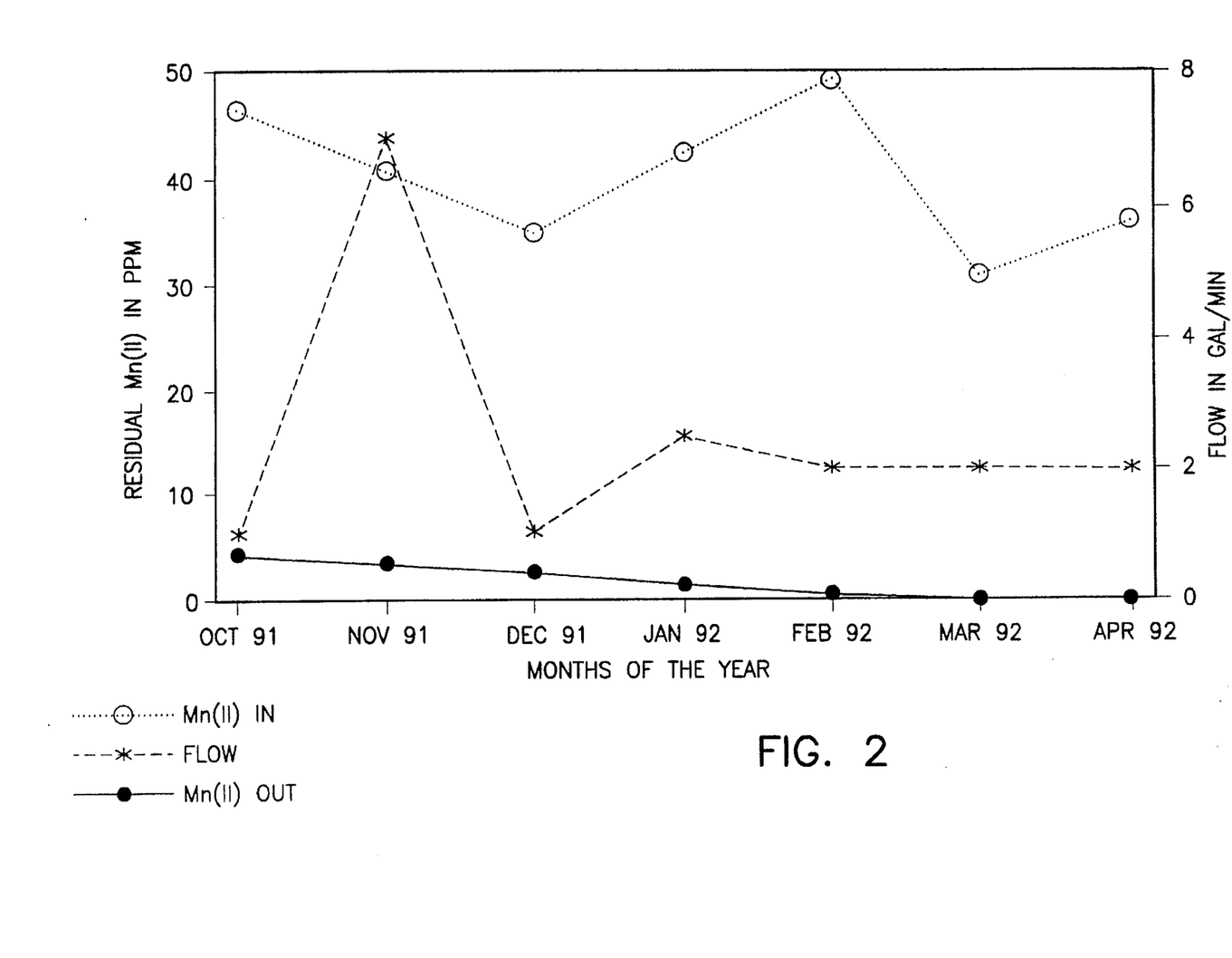
FIG. 2 is a graph showing the manganese concentration taken at the inlet of the treatment zone compared with the manganese concentration taken at the outlet of the treatment zone over a seven month period.

Referring to FIG. 2, the manganese concentration taken at the inlet of the treatment zone compared with the manganese concentration taken at the outlet of the treatment zone is shown over a 7 month period. As can be clearly seen in FIG. 2, there was a significant removal of manganese from the water flowing through the treatment zone, even during the cold winter months. The aerobic metal oxidizing bacteria metabolized the manganese on the porous matrix so that manganese was recoverable as a water insoluble oxide of manganese. It should be noted that the manganese ions in the water were in the Mn (II) and Mn (IV) oxidation states.

Figure 3:
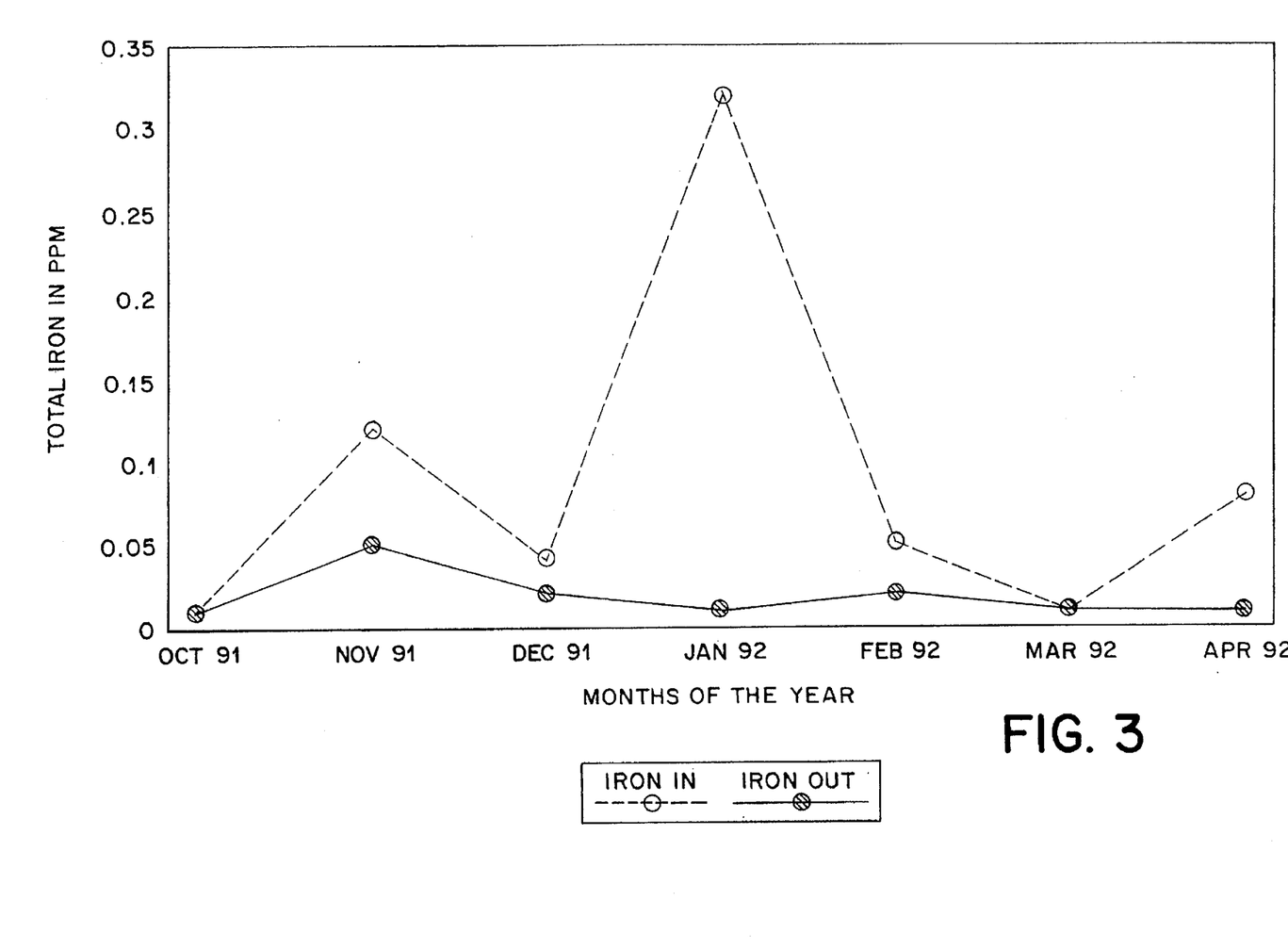
FIG. 3 is a graph showing the iron concentration taken at the inlet of the treatment zone compared with the iron concentration taken at the outlet of the treatment zone over a seven month period.

Referring to FIG. 3, the iron concentration taken at the inlet of the treatment zone compared with the iron concentration taken at the outlet of the treatment zone is shown over a 7 month period. As can be clearly seen in FIG. 3, there was a nearly constant removal of iron from the water flowing through the treatment zone, even during the cold winter months. The aerobic metal oxidizing bacteria metabolized the iron on the porous matrix so that iron was recoverable as a water insoluble oxide of iron. It should be noted that the iron ions in the water were in the Fe (III) oxidation state.

Figure 4:
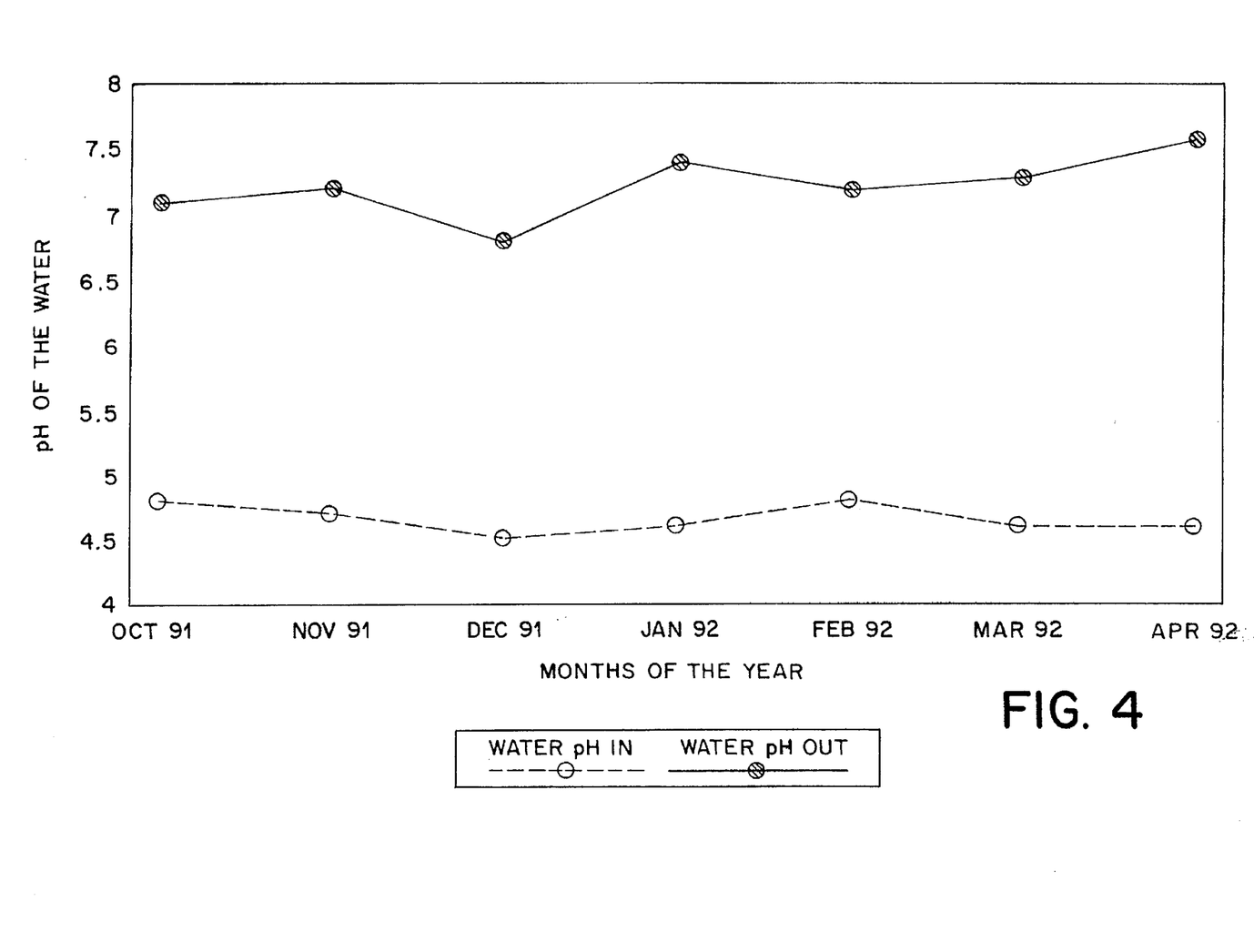
FIG. 4 is a graph showing the pH level of the water at the inlet of the treatment zone compared with the pH level of the water at the outlet of the treatment zone over a seven month period.

Referring to FIG. 4, the pH level of the water at the inlet of the treatment zone compared with the pH level of the water at the outlet of the treatment zone is shown over a 7 month period. As can be clearly seen in FIG. 4, the pH level of the water at the outlet of the treatment zone was significantly increased from the pH level of the water at the inlet of the treatment zone, even during the cold winter months. The pH level change in the water was a result of the aerobic metal oxidizing bacteria interacting with the limestone shale. More specifically, the aerobic metal oxidizing bacteria interact with the limestone shale so as to release calcium carbonate into the water and thereby increase the pH level of the water.

Figure 5:
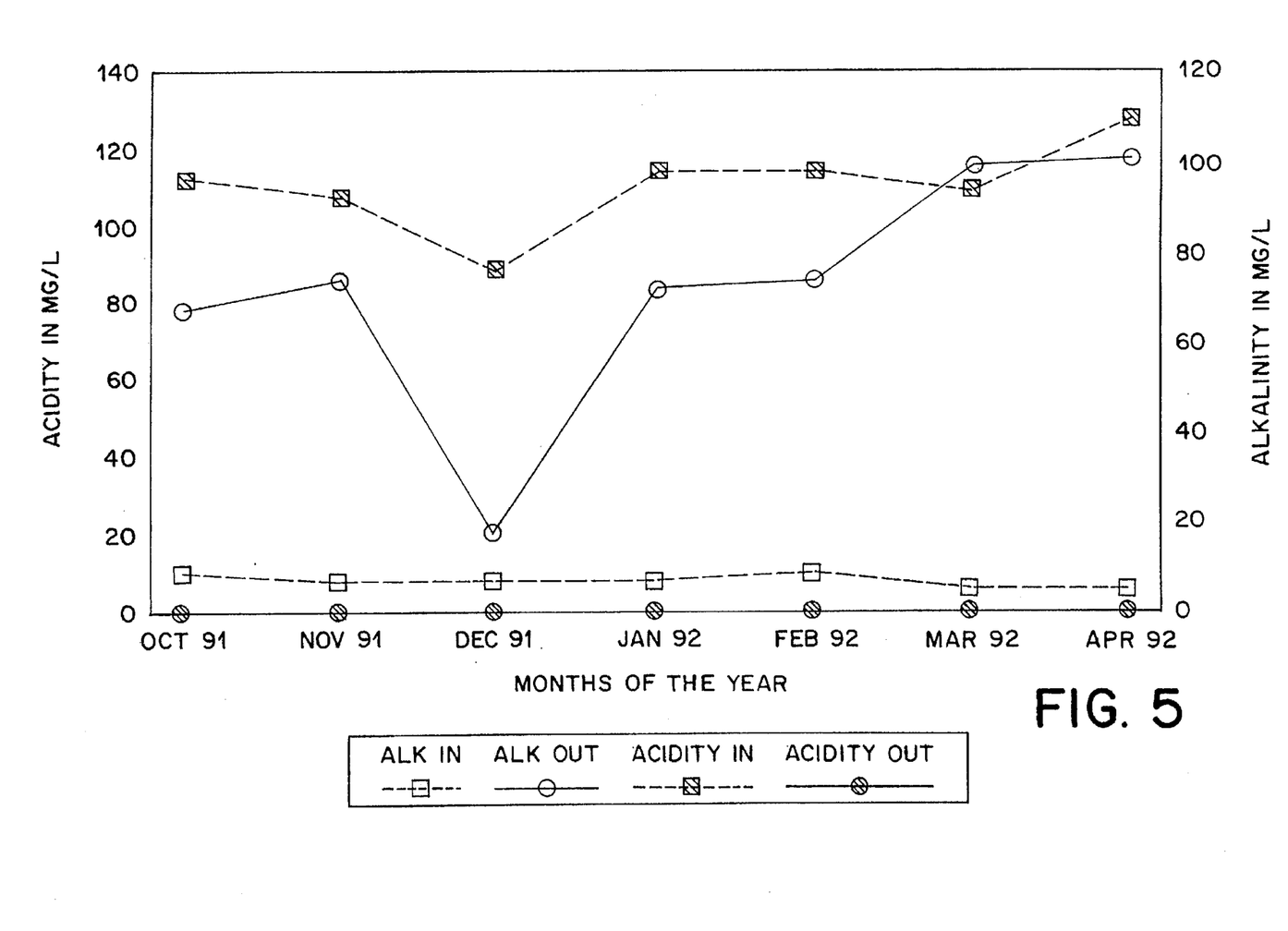
FIG. 5 is a graph showing the acidity and the alkalinity levels of the water at the inlet of the treatment zone compared with the acidity and the alkalinity levels of the water at the outlet of the treatment zone over a seven month period.

Referring to FIG. 5, the acidity and the alkalinity levels of the water at the inlet of the treatment zone compared with the acidity and the alkalinity levels of the water at the outlet of the treatment zone are shown over a 7 month period. As can be clearly seen in FIG. 5, the acidity level of the water at the outlet of the treatment zone was significantly decreased from the acidity level of the water at the inlet of the treatment zone, even during the cold winter months. As can also be clearly seen in FIG. 5, the alkalinity level of the water at the outlet of the treatment zone was significantly increased from the alkalinity level of the water at the inlet of the treatment zone, even during the cold winter months. The acidity level change in the water was a result of the aerobic metal oxidizing bacteria interacting with the limestone shale. More specifically, the aerobic metal oxidizing bacteria interacts with the limestone shale so as to release calcium carbonate into the water and thereby decrease the acidity level of the water. The alkalinity level change in the water was a result of the aerobic metal oxidizing bacteria interacting with the limestone shale. More specifically, the aerobic metal oxidizing bacteria interacts with the limestone shale so as to release calcium carbonate into the water and thereby increase the alkalinity level of the water.

Figure 6:
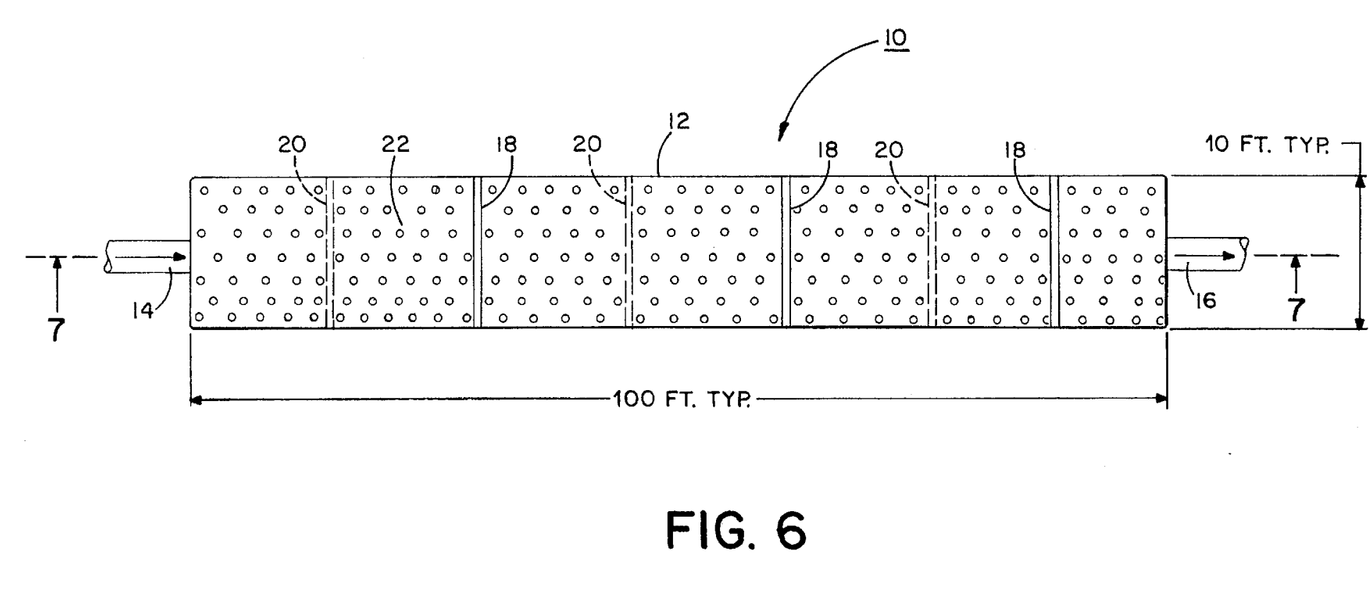
FIG. 6 is a top plan view of a typical treatment zone that is used to reduce the concentration of water soluble metal species in aqueous solutions according to the present invention taken along line 6—6 of FIG. 7.
Figure 7:
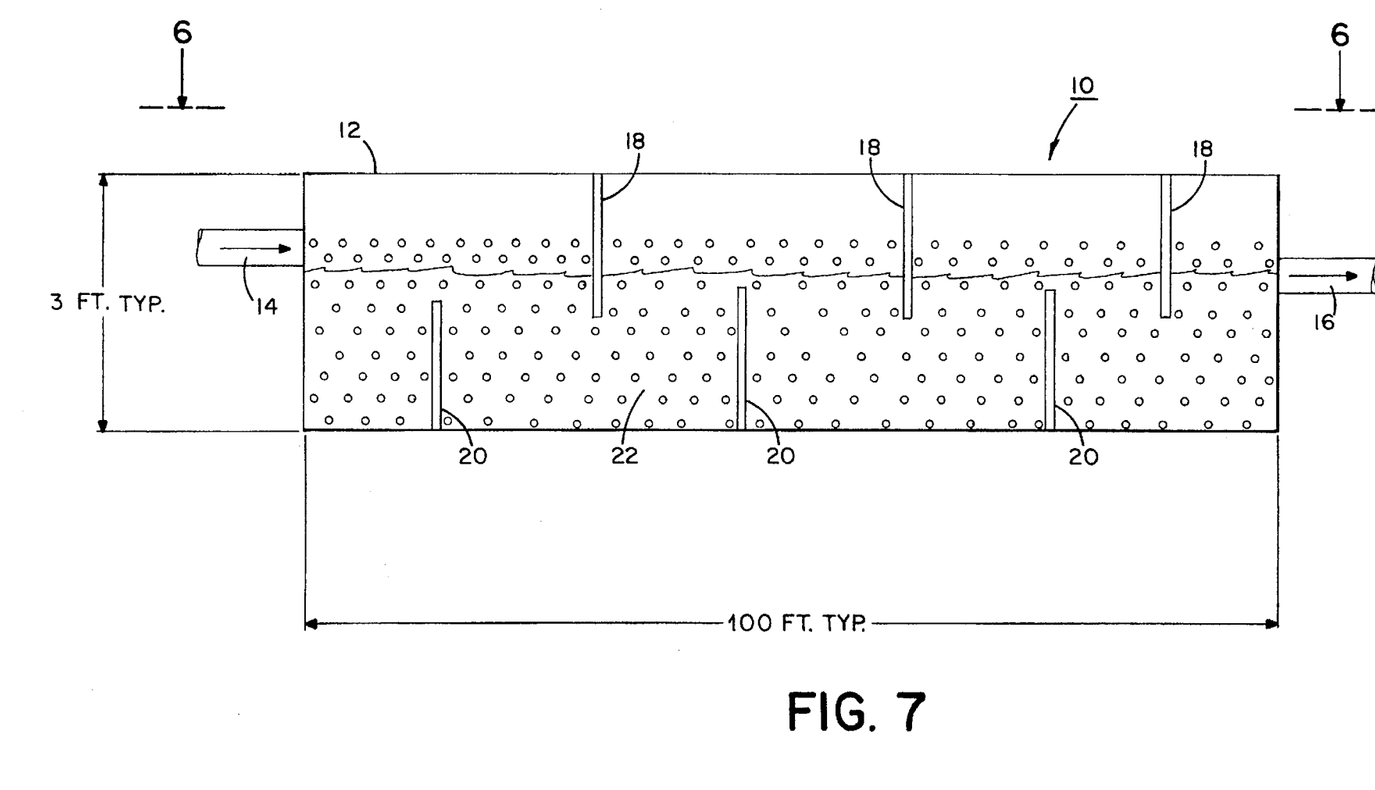
FIG. 7 is a side plan view of a typical treatment zone that is used to reduce the concentration of water soluble metal species in aqueous solutions according to the present invention taken along line 7—7 of FIG. 6.

Referring to FIGS. 6 and 7, there is shown a treatment zone 10 similar to the one just described. The treatment zone 10 is in the form of a basin 12 having an inlet port 14 and an outlet port 16. The inlet port 14 allows water to flow into the basin 12. The outlet port 16 allows water to flow out of the basin 12. The inlet port 14 and the outlet port 16 are located at opposite ends of the basin 12 so as to allow water from a body of water having a concentration of water soluble metal ions contained therein to flow substantially through the entirety of the basin 12. The flow rate of the water from the body of water through the basin 12 may be controlled by gravity by properly positioning the treatment zone 10 with respect to the body of water.

The basin 12 also has a plurality of upper flow barriers 18 and a plurality of lower flow barriers 20. These upper and lower flow barriers 18, 20 are provided so as to prevent a direct flow path and thereby insure that the water from the body of water flows substantially through the entirety of the basin 12. It should also be noted that the treatment zone 10 is left uncovered so as to allow the water flowing therethrough to be sufficiently aerated.

A porous matrix 22 is disposed within the treatment zone 10. The porous matrix 22 is inoculated with a population of aerobic metal oxidizing bacteria. The population of aerobic metal oxidizing bacteria is capable of metabolizing water soluble metal ions in the water from the body of water into water insoluble metal oxides. The water insoluble metal oxides are deposited on the porous matrix 22, thereby allowing for their recovery. Thus, there is an overall decrease in the concentration of the metal ions in the water flowing out of the treatment zone 10 as compared to water flowing into the treatment zone 10. It is important to note that the porous matrix 22 never needs to be regenerated through the use of conditioned water or any other means.

With the present invention treatment zone 10 and corresponding process now fully described, it can thus be seen that the primary objective set forth above is efficiently attained and, since certain changes may be made in the above-described treatment zone 10 and corresponding process without departing from the scope of the invention, it is intended that all matter contained in the above description or shown in the accompanying drawings shall be interpreted as illustrative and not in a limiting sense.

What is claimed is:

1. A system for reducing the concentration of water soluble metal ions in a body of water containing the same, said system comprising:

a treatment zone in the form of a basin having an inlet port and an outlet port, said inlet port allowing water to flow into said basin, said outlet port allowing water to flow out of said basin, said inlet port and said outlet port being located and configured with respect to said basin so as to allow water from a body of water having a concentration of water soluble metal ions contained therein to flow substantially through the entirety of said basin at a controlled rate; and a porous matrix disposed within said treatment zone, said porous matrix being inoculated with a population of aerobic metal oxidizing bacteria from the genus Metallogenium, said bacteria being capable of metabolizing said water soluble metal ions in said body of water into water insoluble metal oxides, wherein the water insoluble metal oxides are substantially retained on said porous matrix, thereby resulting in an overall decrease in the concentration of said water soluble metal ions in water flowing out of said treatment zone as compared to water flowing into said treatment zone.

2. The system for reducing the concentration of water soluble metal ions as defined in claim 1, wherein water from said body of water flows substantially through the entirety of said basin at a controlled rate of up to about 2 gallons of water per cubic foot of said porous matrix per day, and wherein said water soluble metal ions in said flowing water are manganese ions in the Mn (II) and Mn (IV) oxidation states and iron ions in the Fe (III) oxidation state.

3. The system for reducing the concentration of water soluble metal ions as defined in claim 2, wherein the basin of the treatment zone has a plurality of upper flow barriers spaced from each other and depending from the top of the basin, and further has a plurality of lower flow barriers spaced from each other and extending upward from the bottom of the basin, said upper flow barriers and lower flow barriers preventing a direct flow path between the inlet port and outlet port so as to obtain said controlled rate water flow through the treatment zone.

* * * * *

UNITED STATES PATENT AND TRADEMARK OFFICE
CERTIFICATE OF CORRECTION

PATENT NO. : 5,637,210
DATED : June 10, 1997
INVENTOR(S) : William J. Vail
　　　　　　　Robert K. Riley It is certified that error appears in the above-identified patent and that said Letters Patent is hereby corrected as shown below:

Column 1, line 51, "et at" should be --et al--.
Column 1, line 56, "et at" should be --et al--.
Column 1, line 59, "et at" should be --et al--.
Column 1, line 63, "et at" should be --et al--.
Column 1, line 67, "et at" should be --et al--.
Column 2, lines 4 - 5, "et at" should be --et al--.
Column 2, line 8, "et at" should be --et al--.
Column 2, line 16, "et at" should be --et al--.
Column 2, line 21, "et at" should be --et al--.
Column 2, line 32, "et at" should be --et al--.
Column 2, line 42, "et at" should be --et al--.

Signed and Sealed this

Twenty-third Day of December, 1997

Attest:

BRUCE LEHMAN

Attesting Officer　　Commissioner of Patents and Trademarks